3,349,113
PREPARATION OF HYDROQUINONE DERIVATIVES
Urs Gloor, Riehen, Switzerland, Ram Niwas Goel, Bombay, India, and Albert Langemann, Basel, and Rudolf Rüegg, Bottmingen, Switzerland, assignors to Hoffmann-La Roche Inc., Nutley, N.J., a corporation of New Jersey
No Drawing. Filed Aug. 8, 1963, Ser. No. 300,906
Claims priority, application Switzerland, Oct. 9, 1959, 79,226/59
2 Claims. (Cl. 260—476)

This application is a continuation-in-part of United States patent application Ser. No. 56,091, filed Sept. 15, 1960, now abandoned.

This invention relates to processes for the preparation of derivatives of 2,3-dimethoxy-5-methyl-1,4-benzohydroquinone, and of the corresponding quinone derivatives. More particularly, in a comprehensive view, the invention provides a general process which comprises condensing a member selected from a group (A) consisting of 2,3-dimethoxy-5-methyl-1,4-benzohydroquinone and the 4-lower alkanoates and the 4-benzoate thereof with a member selected from a group (B) consisting of the alcohols 3,7,11,15,19,23,27,31,35-nonamethyl-2,6,10,14,18,22,26,30,34-hexatriacontanonaen-1-ol, 3,7,11,15,19,23,27,31,35,39,-decamethyl - 1,6,10,14,18,22,26,30,34,38,-tetracontadecaen-3-ol and 3,7,11,15,19,23,27,31,35,39 - decamethyl - 2,6,10,14,18,22,26,30,34,38 - tetracontadecaen-1-ol and the lower alkoxides and the lower alkanoates of each of said alcohols, in the presence of an acidic condensing agent.

The condensation products produced by the above process having the following general formula:

(I)
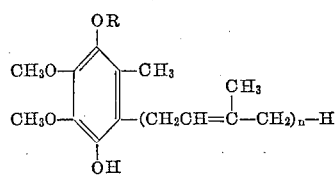

wherein the symbol R represents hydrogen, or lower alkanoyl (e.g. formyl, acetyl or propionyl) or benzoyl; and the symbol $n$ represents 9 or 10.

If the condensation product contains an ester group in the 4-position, the same can be saponified by saponification procedures known per se, thereby yielding products of above Formula I wherein R represents hydrogen, i.e. substituted 1,4-benzohydroquinone products. Said products of Formula I wherein R represents hydrogen are known compounds, and are useful as antioxidants and as intermediates for producing the corresponding substituted 1,4-benzoquinone products. Thus, the products of Formula I wherein R represents hydrogen can be oxidized to the corresponding substituted 1,4-benzoquinones. The latter are also known products, which are significant components of biological oxidation systems, and which are useful as additives to foodstuffs and feedstuffs, especially for consumption during stress conditions, such as during treatment with antibacterial or antiparasitic agents.

As indicated heretofore, the present invention embraces a process in which 2,3-dimethoxy-5-methyl-1,4-benzohydroquinone, or a 4-lower alkanoate or the 4-benzoate derivative thereof, is condensed with (1) 3,7,11,15,19,23,27,31,35-nonamethyl - 2,6,10,14,18,22,26,30,34 - hexatriacontanonaen-1-ol, (2) 3,7,11,15,19,23,27,31,35,39 - decamethyl-1,6,10,14,18,22,26,30,34,38 - tetracontadecaen-3-ol (3) 3,7,11,15,19,23,27,31,35,39 - decamethyl-2,6,10,14,18, 22,26,30,34,38-tetracontadecaen-1-ol or with a lower alkoxide or lower alkanoate of any of said alcohols. The process is characterized in that it is carried out in the absence of a solvent for the reactants in the presence of a Lewis acid as a condensing agent.

In general, the process of this invention is effected while the reactants and the condensing agent are embodied in a homogeneous mixture. The desired reaction takes place when such homogeneous mixture is heated at temperatures between about 20° C. and about 80° C. Lewis acids, and especially zinc chloride, are used as acidic condensing agents; and it is often advantageous when using such salts to effect the condensation in the presence of a lower alkanoic acid, especially glacial acetic acid. As indicated heretofore, the reaction system which characterizes the present invention is substantially solvent free. However, it is advantageous to use an inert organic medium such as diethyl ether, diisopropyl ether or dioxan to produce the starting reaction mixture. By putting the reactants and the acidic condensing agent into such an inert organic solvent, as is done in the preferred embodiment of the invention and then evaporating the same, there is obtained a homogeneous mixture of the reactants, which can then be condensed by heating for a short time (e.g. for a period of from about five minutes to about an hour) at a temperature up to about 80° C. It has been found especially advantageous to conduct the condensation reaction at a temperature of about 50° C. Moreover, it has been found that when the reaction is carried out as disclosed herein, that is, in the absence of a solvent, greatly increased yields of the desired end product are obtained.

As indicated above, in the event that a 4-acyl derivative of a substituted 1,4-benzahydroquinone (e.g. the 4-acetate, 4-propionate or 4-benzoate) is used as a starting material, the 4-hydroxy group in the condensation product can be set free by saponifying the acyl linkage. Such saponification is conveniently effected by treatment with alkali, e.g. with a methanolic potassium hydroxide solution, advantageously in the presence of an inert gas, e.g. under nitrogen. The 2,3-dimethoxy-5-methyl-6-substituted-1,4-benzohydroquinones of Formula I above, thus obtained as saponification products (but also obtainable directly as condensation products), are yellow- to orange-colored materials.

As indicated above also, said substituted 1,4-benzohydroquinones are easily converted to the corresponding substituted 1,4-benzoquinones, by methods known per se, e.g. by shaking the substituted 1,4-benzohydroquinones with silver oxide in ethereal solution at room temperature. The crude products can be purified by methods known per se, advantageously by chromatography and crystallization. They are yellow compounds, and exhibit typical maxima in the ultraviolet absorption spectrum.

The starting material 3,7,11,15,19,23,27,31,35-nonamethyl - 2,6,10,14,18,22,26,30,34 - hexatriacontanonaen-1-ol (solanesol) is a known compound, the preparation of which need not be described. The 1-lower alkoxides and the 1-lower alkanoates thereof, which can also be employed optionally as strating materials in the processes of the invention, can be prepared by etherification and esterification procedures, respectively; such procedures being known per se.

The starting materials 3,7,11,15,19,23,27,31,35,39-decamethyl - 1,6,10,14,18,22,26,30,34,38 - tetracontadecaen-3-ol and 3,7,11,15,19,23,27,31,35,39-decamethyl-2,6,10,14, 18,22,26,30,34,38-tetracontadecaen-1-ol can be prepared as follows:

A solution of 53 g. of 3,7,11,15,19,23,27,31,35-nonamethyl - 2,6,10,14,18,22,26,30,34 - hexatriacontanonaen-1-ol in 50 ml. of petroleum ether (boiling range 40–45° C.), 70 ml. of absolute ether and 1.8 ml. of pyridine is mixed while stirring at 0° to 10° C., within a period of an hour, with a solution of 3.5 ml. of phosphorus tribromide in 20 ml. of petroleum ether. The reaction mixture is stirred for an additional period of two hours at 0° C., then is poured into ice water and extracted by stirring for ten minutes with ether. The ether solution is washed with water, 5% sodium bicarbonate solution and then again with water. The washed extract is dried over sodium sulfate and the solvent is driven off, yielding 55 g. of 3,7,11,15,19,23,27,31,35 - nonamethyl - 2,6,10,14,18,22, 26,30,34-hexatriacontanonaen-1-yl bromide as a thick yellow oil ($n_D^{24}=1.5122$), which upon standing congeals to a waxy mass. The waxy material is mixed with 12.6 g. of ethyl acetoacetate and to the mixture is added dropwise, while stirring well, at about 10° C., within a period of 30 minutes, a solution of 1.8 g. of sodium in 80 ml. of absolute alcohol. Then the mixture is stirred for an additional period of 15 hours at 20° C., after which it is heated to 80° C. and reacted over a period of an hour (by dropwise addition) with 120 g. of a 10% aqueous sodium hydroxide solution, and stirred for an additional period of 4 hours at 80° C. The mixture is then allowed to cool and is poured into ice water; the aqueous mixture is extracted with ether and the ether solution is washed with water. After drying the washed extract and removing the solvent therefrom, there is obtained 47 g. of 6,10,14,18,22,26,30,34,38 - nonamethyl - 5,9,13,17,21,25, 29,33,37-nonatriacontanonaen - 2 - one, which crystallizes from acetone at 0° C. in fine needles.

A solution of 38.5 g. of this ketone in 150 ml. of absolute ether is added dropwise at the boiling temperature of ammonia to a solution of sodium acetylide prepared from 3 grams of sodium and acetylene in 500 ml. of liquid ammonia. The mixture is shaken for 15 minutes in an autoclave at 20° C. and then the ammonia is blown off. The residue is mixed with 20 g. of ammonium chloride, then poured into ice water and extracted with ether. The ethereal solution is washed once with water, dried over sodium sulfate, and the solvent is driven off. There is thus obtained 25 g. of 3,7,11,15,19,23,27,31,35,39-decamethyl - 6,10,14,18,22,26,30,34,38 - tetracontanonaen-1-yn-3-ol as a colorless oil, which crystallizes upon standing. (Determination of active hydrogen: cold, 1.05; warm, 1.85.)

The last named product is partially hydrogenated by dissolving it in 200 ml. of petroleum ether (boiling range 80–105° C.) adding to the solution 2 g. of Lindlar catalyst [Helvetica Chimica Acta 35, 450 (1952)] and 0.2 ml. of quinoline, and shaking in a hydrogen atmosphere at 20° C. until a total of 1100 ml. of hydrogen has been taken up. The catalyst is filtered off and the filtrate is freed of solvent under a water pump vacuum. There is thus obtained 35 g. of 3,7,11,15,19,23,27,31,35,39-decamethyl-1,6, 10,14,18,22,26,30,34,38-tetracontadecaen-3-ol which crystallizes upon standing.

A solution of 20 g. of the last named carbinol in 150 ml. of absolute ether is mixed at 20° C., while stirring, within a period of one hour, with 5 ml. of phosphorus tribromide in 50 ml. of absolute ether, and the mixture is stirred at 20° C. for an additional period of 3 hours. It is then poured into ice water; extracted with ether; the ethereal solution is washed with water, 5% sodium bicarbonate solution and again with water; and dried over sodium sulfate. Upon evaporation of the solvent, there is obtained 23 g. of the bromide ($n_D^{25}=1.5124$), which without further purification is refluxed for 15 hours with a mixture of 100 ml. of absolute acetone and 20 g. of anhydrous potassium acetate. Then the reaction mixture is filtered, the filtrate is freed of solvent under a water pump vacuum, and the residue is refluxed for 1 hour with 5 g. of sodium hydroxide, 5 ml. of water and 100 ml. of alcohol. The mixture is cooled, diluted with water, extracted with ether, the ether solution is washed once with water, dried over sodium sulfate and evaporated to dryness. There is obtained 20 g. of crude 3,7,11,15,19,23,27, 31,35,39 - decamethyl - 2,6,10,14,18,22,26,30,34,38 - tetracontadecaen-1-ol, which is purified by chromatography on 1 kg. of aluminum oxide (Brockmann, activity grade I, with 5% water). Upon elution with benzene, there is obtained 15 g. of purified product as a colorless oil ($n_D^{22}=1.5100$), which crystallizes upon standing.

The 1-lower alkoxides and 1-lower alkanoates of 3,7,11, 15,19,23,27,31,35,39 - decamethyl - 2,6,10,14,18,22,26, 30,34,38-tetracontadecaen-1-ol can be obtained by etherification and esterification procedures, respectively, such procedures being well known per se.

For a fuller understanding of the nature and objects of this invention, reference may be had to the following examples which are given merely as further illustrations of the invention and are not to be construed in a limiting sense.

Example 1

In this example, 36.0 grams of 2,3-dimethoxy-5-methylbenzohydroquinone, 25.0 grams of 3,7,11,15,19,23,27,31,- 35 - nonamethyl - 2,6,10,14,18,22,26,30,34 - hexatriacontanonaen-1-ol and 14.8 grams of zinc chloride were dissolved in 295 ml. of absolute ether with the exclusion of air. The thus obtained solution was concentrated in vacuo with the exclusion of water at a temperature of 20° C. The residue, a brown-colored oil, was warmed at a temperature of 45° C. for twenty minutes in a closed rotating vessel. Therefore, 300 ml. of petroleum ether and 200 ml. of 75% aqueous methanol was added to the reaction product. The petroleum ether layer was subsequently separated from the aqueous methanol layer, following which the petroleum ether layer was washed two times using 80 ml. of 75% aqueous methanol each time. The petroleum ether solution was dried over sodium sulfate and concentrated, under vacuum, at a temperature of 40° C. The resulting brown-colored oil was then dissolved in 300 ml. of ether and shaken with 12 grams of silver oxide for about fifteen minutes. The mixture was filtered and the ether was removed from the filtrate by evaporation, under vacuum, at a temperature of 40° C. There was obtained 29 grams of 2,3-dimethoxy-5-methyl-6-(3,7,11,15,- 19,23,27,31,35 - nonamethyl - 2,6,10,14,18,22,26,30,34- hexatriacontanonaen-1-yl)-1,4-benzoquinone in the form of a red-orange colored oil having a U.V. absorption maximum at $$270 \text{ m}\mu \ (E_1^1=120)$$

The yield reported herein amounted to 58% of theory.

For comparative purposes, the foregoing procedure was repeated using the same ingredients in the same relative proportions. In this comparison, however, the condensation was effected while the reactants and the condensing agent were dissolved in ether. In such procedure there was obtained the desired 2,3-dimethoxy-5-methyl-6-(3,7,11,- 15,19,23,27,31,35-nonamethyl - 2,6,10,14,18,22,26,30,34- hexatriacontanonaen - 1 - yl)-1,4-benzoquinone in a yield amounting to only about 4% of theory.

Example 2

To a solution of 3.5 g. of 2,3-dimethoxy-5-methyl-1,4- benzohydroquinone and 14 g. of 3,7,11,15,19,23,27,31,35,- 39-decamethyl - 2,6,10,14,18,22,26,30,34,38 - tetracontadecaen-1-ol in 200 ml. of absolute ether there was added 2.5 g. of zinc chloride and 0.2 ml. of glacial acetic acid. The reaction mixture was shaken until complete solution occurred. Then the solvent was removed, the residue was heated at 50° C. for 15 minutes and then was taken up in 250 ml. of petroleum ether (boiling range 40–45° C.). The petroleum ether solution was washed four times, each time with 125 ml. of 75% methanol. Each of the methanol extracts was shaken twice, each time with 200 ml. of petroleum ether. The combined petroleum ether extracts were dried over anhydrous sodium sulfate and the solvent was distilled off in vacuo. The yellow-brown oil obtained was dissolved in 150 ml. of absolute ether and the solution was mixed with 20 g. of silver oxide. The reaction mixture was shaken for one-half hour in a nitrogen atmosphere, the silver oxide was filtered off and the filtrate was concentrated to dryness. There was thus obtained 12.25 g. of a crude product which showed a U.V. maximum 270 mµ in petroleum ether. This crude residue was purified, using petroleum ether (40–45° C.) as the mobile phase, on 300 g. of aluminum oxide (Brockmann, Activity I, with 7% of water). The fractions obtained upon elution with petroleum ether, and petroleum ether containing 2% of ether, which show an $E_1^1$ value of 100–142 were collected. The residue of these fractions was further purified on a polyethylene column, using 80% acetone as the mobile phase. The thus obtained 2,3-dimethoxy-5-methyl-6-(3,7,11,15,19,23,27,31,35,39 - decamethyl-2,6,-10,14,18,22,26,30,34,38-tetracontadecaen-1-yl)-1,4 - benzoquinone which was obtained in an excellent yield absorbed at 270 mµ in the ultraviolet; M.P. 49° C.

By substituting 1 - acetoxy-3,7,11,15,19,23,27,31,35,39-decamethyl-2,6,10,14,18,22,26,30,34,38-tetracontadecaene in lieu of 3,7,11,15,19,23,27,31,35,39-decamethyl-2,6,10,-14,18,22,26,30,34,38-tetracontadecaen-1-ol - but employing otherwise identical reaction conditions, a high yield of the same benzoquinone derivative was obtained.

*Example 3*

To 18.5 g. of 2,3-dimethoxy-5-methyl-1,4-benzohydroquinone and 13.9 g. of 3,7,11,15,19,23,27,31,35,39 - decamethyl - 1,6,10,14,18,22,26,30,34,38 - tetracontadecaen-3-ol was added a solution of 7.4 g. of anhydrous zinc chloride in 150 ml. of ether. The mixture was shaken until complete solution took place and the solvent was removed in vacuo at 20° C. while excluding moisture. The residue was then heated at 45° C. for 20 minutes and thereupon was disoslved in 100 ml. of petroleum ether (boiling range 40–45° C.) and 50 ml. of 75% aqueous methanol. The petroleum ether phase was separated and was washed three more times with 75% aqueous methanol. Each of the methanol extracts was shaken twice with 50 ml. of petroleum ether. The combined petroleum ether extracts were dried over anhydrous sodium sulfate and the solvent was distilled in vacuo. The yellow-brown oil obtained was dissolved in 250 ml. of ether and shaken with 5 g. of silver oxide. Then the silver oxide was filtered off and the filtrate was evaporated to dryness. There was thus obtained 15.3 g. of a crude product which, when dissolved in petroleum ether, showed a maximum in the ultraviolet at 270 mµ. This residue was purified on 500 g. of aluminum oxide (Brockmann, Activity I, with 7% of water) using petroleum ether (boiling range 40–45° C.) as the mobile phase. The fractions obtained upon elution with petroleum ether, which vary from colorless to light yellow, were discarded. Then elution was performed with petroleum ether containing 5 to 10% of ether, the solvent was removed from the eluate, and the residue was purified on a polyethylene column using 80% acetone as the mobile phase. There was obtained, in a high yield, 2,3-dimethoxy-5-methyl-6-(3,7,11,15,19,23,27,31,35,39 - decamethyl - 2,6,10,14,18,22,26,30,34,38 - tetracontadecaen-1-yl)-1,4-benzoquinone of M.P. 49° C.

*Example 4*

A solution of 3.4 g. of 2,3-dimethoxy-5-methyl-1,4-benzoquinone in 50 ml. of methanol was hydrogenated, using Lindlar catalyst. The solvent was distilled off under diminished pressure and the residue was dried for 3 hours in a high vacuum. The thus obtained 2,3-dimethoxy-5-methyl-1,4-benzohydroquinone was dissolved in 150 ml. of absolute ether and the solution was mixed with 13 g. of 3,7,11,15,19,23,27,31,35 - nonamethyl-2,6,10,14,18,22, 26,30,34-hexatriacontanonean-1-ol. To this solution was added 2.5 g. of zinc chloride and 0.2 ml. of glacial acetic acid and the mixture was shaken until solution was completed. The mixture was freed of solvent and the residue (17 g.) was heated for 15 minutes at 50° C. Then the mixture was dissolved in 350 ml. of petroleum ether (boiling range 40–45° C.). The petroleum ether solution was washed 5 times, each time with 100 ml. of 75% methanol; dried over sodium sulfate; and the solvent was removed. The residual material (13.75 g.) was dissolved in 150 ml. of absolute ether, the solution was mixed with 20 g. of silver oxide and the reaction mixture was shaken for one hour under nitrogen. The silver oxide was filtered off and the filtrate was evaporated to dryness. There was obtained 12.4 g. of a product which exhibits an ultraviolet maximum at 270 mµ in petroleum ether (spectroscopic yield 35%). This material was purified by chromatography on 350 g. of aluminum oxide (Brockman, Activity I, deactivated with 7% of water), using petroleum ether (60–90° C.) as the mobile phase. The fractions obtained by using petroleum ether, and petroleum ether mixed with 2% of ether, which exhibit an $E_1^1$ value of 55–144 were combined and were further purified on polyethylene, using 80% acetone as the mobile phase. In this manner there was obtained 2,3-dimethoxy-5-methyl-6-(3,7,11,15, 19,23,27,31,35 - nonamethyl - 2,6,10,14,18,22,26,30,34-hexatriacontanonaen-1-yl)-1,4-benzoquinone of M.P. 45° C., U.V. absorption maximum at 270 mµ in petroleum ether.

By employing 1 - methoxy - 3,7,11,15,19,23,27,31,35-nonamethyl - 2,6,10,14,18,22,26,30,34-hexatriacontanonaene in lieu of 3,7,11,15,19,23,27,31,35-nonamethyl-2,6,10, 14,18,22,26,30,34 - hexatriacontanonaen - 1-ol, but under otherwise identical reaction conditions, a high yield of the same substituted benzoquinone last identified above was obtained.

We claim:
1. A process which comprises the steps of (1) forming a homogeneous reaction mixture consisting essentially of (a) an inert organic solvent, (b) a member selected from the group consisting of 2,3-dimethoxy-5-methyl-1,4-benzohydroquinone and the 4-lower alkanoates and the 4-benzoate thereof, (c) a member selected from the group consisting of the alcohols 3,7,11,15,19,23,27,31,35-nonamethyl-2,6,10,14,18,22,26,30,34-hexatriacontanonaen-1-ol, 3,7, 11,15,19,23,27,31,35,39 - decamethyl - 1,6,10,14,18,22,26, 30,34,38-tetracontadecaen-3-ol and 3,7,11,15,19,23,27,31, 35,39 - decamethyl-2,6,10,14,18,22,26,30,34,38-tetracontadecaen-1-ol and the lower alkoxides and the lower alkanoates of each of said alcohols and (d) a Lewis acid condensing agent, (2) removing said solvent from said homogeneous reaction mixture and (3) heating the residue to a temperature not higher than about 80° C.

2. The process according to claim 1 wherein zinc chloride is used as the condensing agent, and wherein the said residue is heated to a temperature of about 50° C.

References Cited

UNITED STATES PATENTS 2,839,570    7/1958    Lindlar _____ 260—476

OTHER REFERENCES

J.A.C.S., vol. 80, pp. 4751–53 (1958).
MacArdle: Use of Solvents, pp. 1–5 (1925).

LORRAINE A. WEINBERGER, *Primary Examiner.*

D. HORWITZ, *Examiner.*

D. P. CLARKE, A. THAXTON, *Assistant Examiners.*

UNITED STATES PATENT OFFICE
CERTIFICATE OF CORRECTION

Patent No. 3,349,113  October 24, 1967

Urs Gloor et al.

It is certified that error appears in the above identified patent and that said Letters Patent are hereby corrected as shown below:

Column 2, line 31, "1,4-benzahydroquinone" should read -- 1,4-benzohydroquinone --; line 57, "strating" should read -- starting --. Column 3, line 37, "25 g." should read -- 35 g. --. Column 5, line 34, "disoslved" should read -- dissolved --.

Signed and sealed this 17th day of February 1970.

(SEAL)
Attest:

Edward M. Fletcher, Jr.
Attesting Officer

WILLIAM E. SCHUYLER, JR.
Commissioner of Patents